3,392,220
INSULATION OF CYLINDRICAL VESSELS

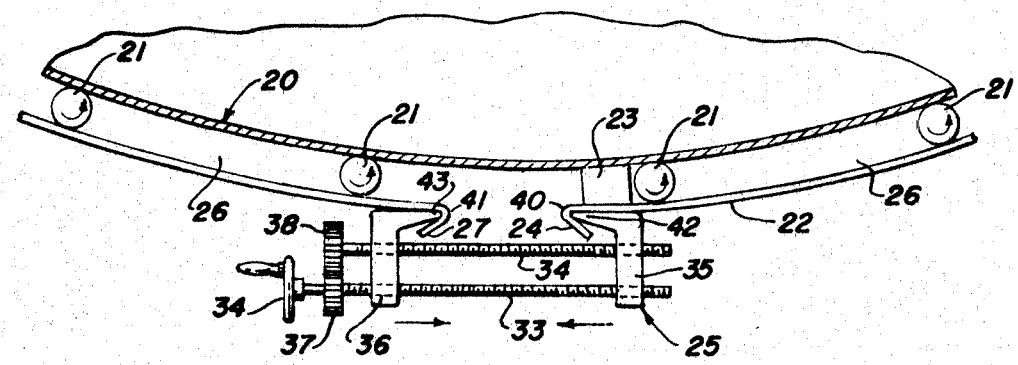
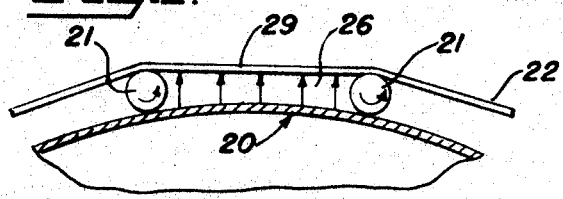
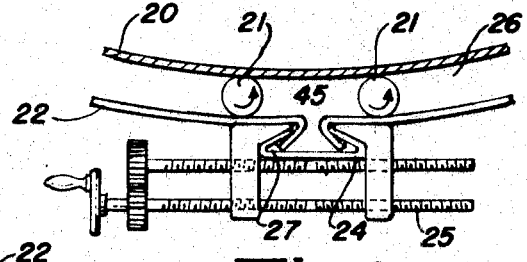
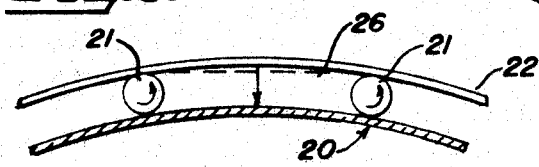
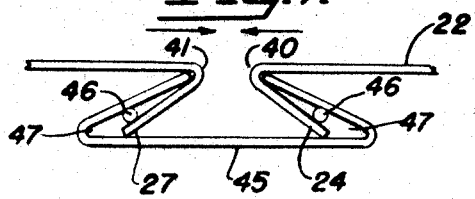
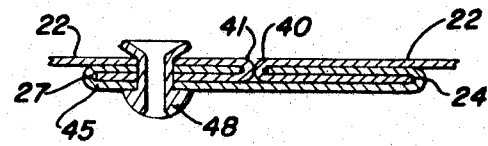

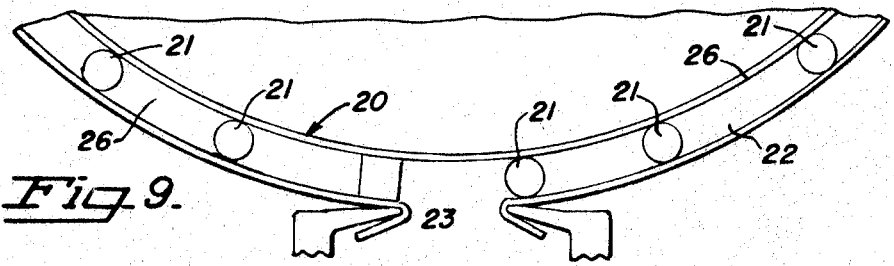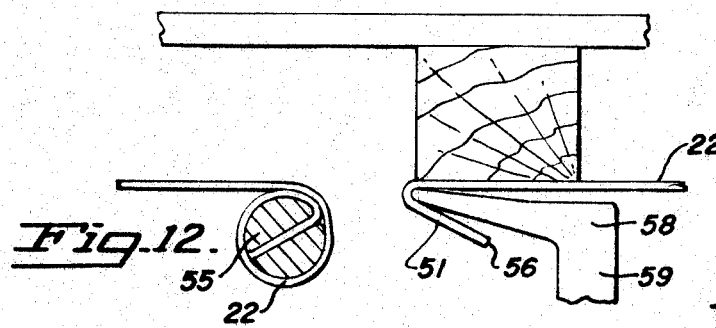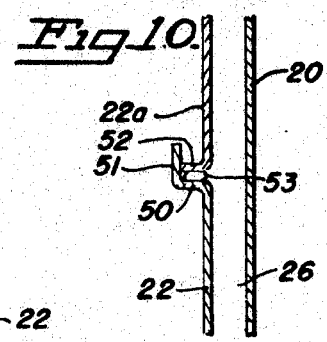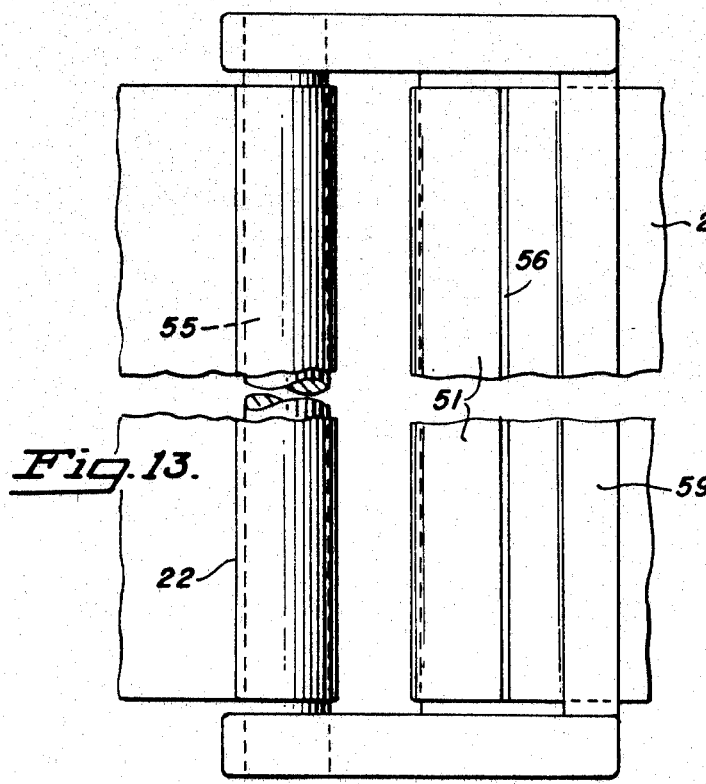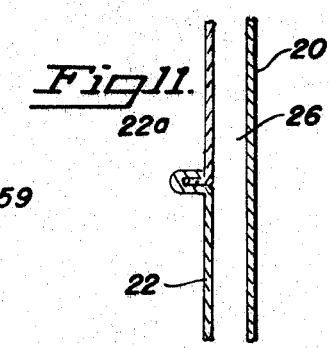
INVENTOR
ROGER G. JENNINGS
BY
Owen, Wickersham & Erickson
ATTORNEYS

Roger G. Jennings, Berkeley, Calif., assignor, by mesne assignments, to Olin Mathieson Chemical Corporation, a corporation of Virginia
Filed Dec. 27, 1965, Ser. No. 516,558
10 Claims. (Cl. 264—45)

My invention relates to the insulation of cylindrical vessels, such as storage tanks, tank cars, and processing vats. More specifically, my invention relates to improvements in the application of foam-in-place rigid plastic foam insulation to such structures and to the resulting structures.

Cylindrical vessels, such as storage tanks for crude oil or liquefied petroleum gas or other liquefied gases, wine fermenting tanks, and railroad and automotive tank cars and wagons, often require insulation. Sometimes, insulation is primarily provided to prevent sudden temperature changes in the contents as a result of atmospheric temperature changes or the heating action of sunlight on the surface of the vessel. Sometimes the insulation is primarily for the purpose of minimizing the size of refrigeration machinery or liquefaction equipment required to maintain a given volume of liquefied gases in the liquid state and under the desired pressure.

When conventional insulation materials (such as fibrous glass, mineral fibers, and expanded vermiculite having an open cellular or fibrous nature) were used to insulate a surface whose temperature was substantially below the freezing point of water, vapor barriers had to be provided to prevent the ingress of moisture vapor; otherwise moisture driven through the insulation, formed ice on the surface of the tank and within the insulation, destroying the insulation efficiency. The vapor barrier was often a secondary steel shell, which ordinarily cost about 30 to 75% as much as the tank itself.

To reduce the expense involved in such a double-wall construction, some insulation materials, such as cellular polystyrene, cellular glass, and cellular polyvinyl chloride have been applied in block form. These materials had significantly lower moisture vapor permeability rates. They were applied to the surface of the tank with an adhesive; then an outer vapor barrier covering of metal or mastic was applied to the insulation. However, it was extremely difficult to achieve a vapor barrier which was completely impermeable to moisture vapor, and many insulation failures as a result of ice formation on the tank surface have been observed in the field.

The advent of polyurethane rigid foam-in-place plastics (derived from organic polyisocyanates and polyether or polyester polyhydroxy compounds) provided a major improvement in the insulation of such low-temperature storage tanks. When applied by foam-in-place techniques, polyurethane adheres tenaciously to appropriately prepared surfaces, and forms a "skin" of high-density foam material at the interface of the tank and the foam as well as at the juncture of the foam and the exterior protective covering. Further, foam-in-place plastics could be applied in successive applications, the first-applied material being cured under proper conditions, and a second application of material then put in adjacent to it. These foam-in-place plastics have the secondary advantage of self-adhesion; that is, they adhere tenaciously to previously placed material and make it possible to obtain a completely monolithic layer of insulation with no cracks, voids or other defects, such as tended to result from imperfect workmanship when block insulation was applied. Further, the excellent adhesion of the foam-in-place plastic to the substrates provide an insulation that has considerably improved mechanical characteristics, whether rigid polyurethane foams are used or epoxide polymers, polyester resins, or phenolic resins. It may be noted that the application technology for rigid polyurethane foams is the most highly developed, especially since inert fluorocarbon blowing agents have come into use for expanding the polyurethane resins into an insulation product having the lowest coefficient of thermal conductivity of any presently commercially available insulation material, at the temperatures at which these vessels are normally used.

The basic problem in using foam-in-place insulation has been to create a suitable cavity in which to form and set the plastic foam. Conventionally, in the insulation of a tank with a vertical cylindrical axis, a series of spacer blocks has been placed vertically on the surface of the tank at suitable intervals to hold at the proper distance an exterior insulation jacket which was to form the outer wall of the cavity. These spacer blocks were typically of wood or of pre-foamed and fabricated cellular plastic materials or of other substantially rigid material having acceptable thermal insulation qualities, and they were attached to the surface of the tank by such means as welded clips or adhesive. Two major problems were encountered in connection with the cavity. The first was that significant pressures were generated as the foam expanded and that these caused the more-or-less flexible outer insulation covering to deflect from its originally applied position. Such deflection was undesirable economically, because additional foam material was then required to fill the resulting larger cavities; it also led to non-uniform deflection or bulging of the outer covering, which detracted from the otherwise symmetrical appearance of the insulated vessel. Second, the foaming pressure was often sufficient to cause the foam to migrate, while in a gelled or semi-liquid condition, past the vertical separators into an adjacent cavity not yet filled to the level of the cavity then being filled; then this spilled-over foam hardened and restricted the flow of subsequently applied foam and led to the formation of voids or fissures within the insulation and consequent loss of insulation efficiency.

Additionally, substantial difficulties were encountered in the field application of these cellular plastic insulation materials behind metallic outer coverings, due to substantial changes in jacket temperature during application as a result of atmospheric temperature changes or of sunlight falling on a portion or all of the insulation jacket. For instance, in many parts of the world it is not uncommon to have a temperature change of 50° F. between mid-day or mid-afternoon and late evening; also changes in surface temperatures of materials that are only partly reflective and of low specific heat such as aluminum, which is often used for insulation jacketing, may then change even more, due to surface heating as a result of exposure to direct sunlight. Even when the jacketing material was installed fairly tightly initially, its linear thermal expansion upon substantial temperature changes tended to cause it to become relatively loose and to cause additional bulging and deformation upon the application of the plastic foam.

My invention reduces or eliminates these undesirable effects, while maintaining all of the desirable features of thin-gauge metallic insulation jacketing. By means of my invention, a uniform tensile force can be applied to the insulation jacket completely around the periphery of the tank, thereby minimizing variations in deformation as a result of foaming pressure. Even more important, by means of the application of tensile stress within the insulation jacket, a substantial force is created to resist the deformation of the jacket upon the application of the foaming pressure. Further, means can be provided in the tensioning apparatus to maintain a constant tensile force, even though the sheet may substantially expand or contract as a function of its surface temperature due to changes in temperature. The proper tensile force can thus be applied to the insulation jacket for exactly counteracting the foaming pressure and thereby maintaining concentricity of the insulation jacketing with respect to the wall of the vessel.

Other objects and advantages of the invention will appear from the following description of some preferred embodiments.

In the drawings:

FIG. 3 is an enlarged fragmentary view in section of the tensioning means for the tank of FIG. 1 before tightening.

FIG. 4 is a diagrammatic view of a portion of the tank showing the effect of prestressing applied in accordance with this invention, as by the means of FIG. 3 after tightening.

FIG. 5 is a view similar to FIG. 4 showing what happens when foaming pressure is exerted on the structure of FIG. 4.

FIGS. 6, 7 and 8 are fragmentary views similar to FIG. 3 showing a closure of the insulation jacket, to provide a weatherproof, mechanically sound seal therein and showing different stages of installation of the closure as well as on different scales.

FIG. 9 is a view similar to FIG. 3 showing the use of a solid block of low thermal conductivity material as a starting point for applying the insulation.

FIGS. 10 and 11 are fargmentary views in elevation showing an edge support system for successive applications of insulation jacketing.

FIG. 12 is a fragmentary horizontal view in section of an alternative tensioning means.

FIG. 13 is a fragmentary view in elevation of the tensioning device of FIG. 12, broken in the middle to conserve space.

Figure 1:
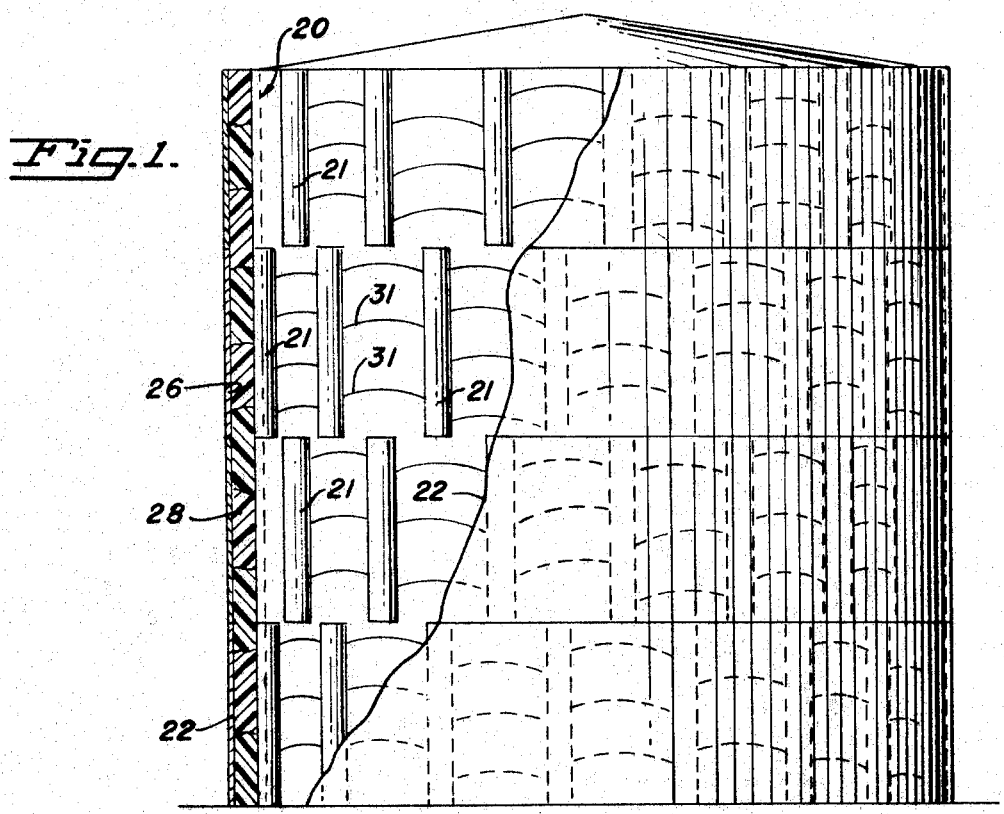
FIG. 1 is a view in elevation and partly in section of an insulated vertical cylindrical vessel embodying the principles of this invention, with portions broken away to show the construction of the insulation.
Figure 2:
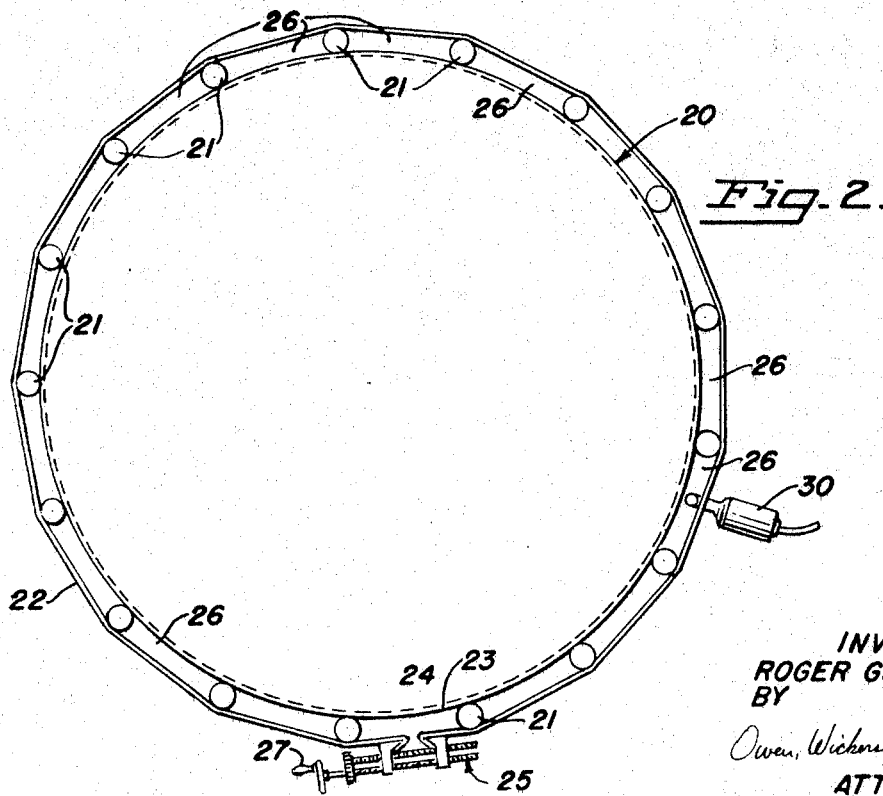
FIG. 2 is a top plan view of the vessel of FIG. 1.

FIGS. 1 and 2 show a cylindrical vessel 20 around which are installed a plurality of vertical cylindrical rollers or spacers 21 of diameter equal to the desired insulation thickness for the vessel 20. The rollers 21 have a length equal to the height of an insulation jacket 22 that is later placed around them, less an allowance for overlap at the sheet during installation. The rollers 21 may be temporarily held in place by means of lightly gluing them or otherwise securing them to the wall 20 in a manner which does not impede their subsequent rolling, upon the application of a rotational force.

Located adjacent to or substituting for one of the cylindrical rollers 21 there may be a rectangular support block 23 for helping to anchor the starting end 24 of a continuous metallic sheet forming the jacket 22, which is attached to tightening means 25 supported on the support block 23. The jacket 22 may be installed around the cylindrical rollers 21, circumscribing the periphery of the tank and spaced by the rollers 21 at an appropriate distance from the tank 20.

An important feature of my invention is the use of the cylindrical spacers 21, whose axis is parallel to the cylindrical axis of the tank 20, whether the tank 20 is vertical as shown or is horizontal, as in tank cars. The spacers 21 are separated from each other by a distance appropriate to the radius of the tank 20, the foaming pressure of the plastic insulating material to be used, and the nature of the jacket 22. The diameter of the cylindrical spacers 21 is roughly that of the desired insulation thickness (whose minimum thickness $t$ is $$t = \left(r + \frac{d}{2}\left(1 + \sec\frac{\phi}{2}\right)\right) \cos\frac{\phi}{2} - r$$

where $r$ is the radius of the tank 20,
$d$ is the diameter of the roller 21, and
$\phi$ is the included angle between successive rollers 21, as taken from the center of the tank 20 and whose length is equal to the vertical height of the sheet 22 of insulation jacketing being applied, less overlap. These rollers 21 are affixed to the tank 20 in the desired locations by such means as a pressure sensitive adhesive of low tenacity so that they can roll upon the application of a substantial force, but they are held sufficiently to prevent them from falling off the side of the vessels during the process as a result of the forces of wind, rain, or accidental mechanical abuse. Such cylindrical rollers 21 may be manufactured from cellulose, wood, plastic or other material of low thermal conductivity; if the material is of sufficient strength, the rollers 21 may be in the form of a hollow tube, which may or may not be filled with cellular plastic for improved insulation.

Over these cylindrical rollers 21 is placed the continuous length of jacketing material 22, circumscribing the periphery of the vessel 20. This single sheet of insulation covering may be applied either from a continuous roll or may be the result of joining individual sheets of covering material together to form a continuous length having sufficient joint strength to withstand substantial tensile forces.

The spacing of the rollers 21, i.e., the included angle between them, depends upon the type of insulation, the pressure created by the foaming materials in the cavity 26, the amount of deflection of the jacket 22 which is acceptable from an aesthetic or economic standpoint, and the sheet size, weight, and self-supporting characteristics of the jacket 22.

Although many types of outer jackets 22 are available for insulation on tanks 20 that are retained at low or moderate temperatures, including plastic films, sheet metals, cement asbestos sheets, and Masonite, and other particle boards, the use of sheet metal is usually preferable because of its low moisture vapor transmissibility, longevity, resistance to puncture and other mechanical abuse, structural strength to withstand the foaming pressures developed, and visual attractiveness. Both ferrous and non-ferrous sheeting are normally used for this application and they vary in thickness from 0.010 to 0.125 inch in thickness, the non-ferrous materials (e.g., aluminum) being preferred due to their resistance to corrosive elements at minimum maintenance, since it is not necessary to cover them with a corrosion-protective coating and to renew the coating periodically. In normal practice, the thickness of the insulation jacket 22 may be about 0.010 to 0.020 inch, a thickness sufficient to withstand mechanical abuse and to provide the needed strength without excess weight and consequent application difficulties or cost.

Joints in the insulation jacket 22 are undesirable, not only due to the cost of making sure that they are moisture proof and vapor proof, but also because of the possibility of substantial shear forces being developed at these joints as a result of expansion and contraction of the jacket 22 different from that of the insulation and the tank. Hence, it is advisable to use a single sheet of aluminum of maximum width commensurate with field handling procedures and in roll form.

After circumscribing the tank 20 with the rolls 21 and with the jacket 22, the two free ends 24 and 27 of the sheet 22 are secured to the tensioning means 25 and are pulled together. At this time, the cylindrical shape of the rollers 21 becomes important. Conventional rectangular supports have such large coefficients of friction against the insulation jacket 22, particularly on larger tanks, that they preclude the creation of substantial tensile forces in tht jacket 22, particularly at locations distant from the tensioning device 25; further, the use of firm adhesives to hold the outer covering to the support spacers made tensioning of the jacket 22 essentially impossible. In contrast, with my invention the rollers 21 roll when tension is applied (as in FIGS. 4 and 5) and tension is imparted to the jacket 22 substantially uniformly around the tank 20. This rolling is an important feature of this invention. This technique is contrasted with the conventional insulation means where rectangular spacing blocks separate insulation jacketing from tank surface and imposes substantial frictional forces resisting the establishment of tensile forces that will later be useful in reducing deformation of the insulation jacketing 22.

When the jacket 22 is installed and tensed, the shape thereof is polygonal or chordal instead of arcuate, as can be seen at 29 in FIGS. 4 and 5. Then foam-in-place cellular plastic 28 may be introduced into the vertical or horizontal cavities 26 so formed, preferably by portable foaming apparatus 30. The jacket 22 is normally about 4-feet high, a standard mill width for such materials, and ordinarily the foaming apparatus 30 is moved from cavity to cavity in a fixed pattern circumscribing the tank 20, placing from one to four feet of foam material 28 in each cavity 26.

The pressure developed in the foam 28 is considerable and it acts against the boundaries of the cavity 26. The tension holds the rollers 21 in place at this time, as does the built up plastic foam in adjacent cavities, once it has been applied. The tank 20 has a thick wall, and so the pressure is resolved by stretching the jacket 22 outwardly. Heretofore, this meant a very awkward looking series of epicyclic curves, but with the present invention the expansion merely restores the chords 29 to the arcuate shape. Their being in tension makes the chords 29 withstand considerable force in making the change back to the arcuate shape and the entire structure may be calculated in advance to produce in the end a smooth cylinder.

When all the cavities 26 of the bottom jacket 22 are filled with cellular plastic foam 28, an upper sheet 22 is erected and filled, the operation continuing in sequence until the full height of the vessel 20 is achieved. Interfaces 31 are shown between typical pours of the cellular plastic material 28. Multiple pours are generally necessary in such applications to minimize foaming pressure which is approximately proportional to pour height. So the application of the insulation jacketing 22 of a specific height, followed by the filling of the cavity 26 so created with cellular foam-in-place plastic 28 may be repeated indefinitely, thereby placing no limit on the height or length of the tank to be insulated.

FIG. 3 shows one form of tension creating means 25 which can impose upon the insulation jacketing 22 the required tensile stress. The device 25 is similar to a carpenter's clamp, comprising ambidextrous threaded rods 33 and 34 mating with threaded holes in gripper blocks 35 and 36 and driven spur gears 37 and 38. The purpose of using two threaded rods 33 and 34, rather than a single rod, is to provide for parallel movement of gripper blocks 35 and 36, although this may be achieved by other means. A hand wheel 39 or a motor or other drive means may be utilized to rotate the threaded rod 33 and the gear 37 so as to drive the gear 38 and rod 34, thereby to move gripper blocks 35 and 36 closer together or farther apart. The insulation jacketing 22 has near its extremities 24 and 27 oblique bends 40 and 41 into which jaws 42 and 43 of the gripper blocks 35 and 36 are installed. The oblique bends 40 and 41 provide a uniform surface contact for the gripper blocks 35 and 36 whose height is preferably equal to or greater than the height of the insulation jacketing 22, thus applying a uniform pressure to the entire sheet 22. By counter-clockwise rotation of the hand wheel 39, the gripper blocks 35 and 36 are caused to move closer together as shown in the dashed lines, thus drawing the free ends 24 and 27 of the sheet 22 closer together and imposing a tensile force within the sheet 22. This tensile force is limited only by the tensile strength of the insulation jacketing itself, or the compressive strength of the rollers 21.

To provide a simple, permanent, and weatherproof closure of the free ends of the sheet 22 which will maintain a tensile force on the sheet for as long as desired, I insert (see FIG. 6) a closure strip 45 bent to the shape of a triangle with an open apex (see FIG. 7) between the free ends of the oblique bends 40 and 41 and the gripper blocks 35 and 36. Beads 46 of the caulking compound or mastic can then be provided in the spaces 47 between the closure strip 45 and the terminal portions of the jacket 22. Further, the closure strip 40 can then be pressed flat against the insulation jacketing 22 (see FIG. 8) and riveted then for permanence by a plurality of drive rivets 48; thus a weatherproof tensioning closure system is provided.

To provide for support of one free end of the sheet during initial application of the insulation jacketing, there may be one rectangular block 23 (see FIG. 9) to which a part near one end of the insulation jacketing 22 may be affixed by mechanical or adhesive means. The use of such a solid block 23 depends upon the field erection techniques chosen for utilization of my system of insulation.

Installation of successive courses or lifts of the insulation jacketing 22 may be assisted by providing a support for the bottom edge of the upper sheet being installed, the support preferably being a part of the previously installed lower sheet 22. Such a structure is shown in FIGS. 10 and 11 where the top edge of the lower sheet 22 has been formed with two 90° bends in the form of a Z to provide a horizontal shelf 50 and an upper lip 51. The upper sheet 22a has a lower edge with a 90° bend to provide a foot 52 (in the shape of an L) which fits onto the shelf 50 and within the lip 51 of the Z-shaped section, thus providing rigidity as well as a joint that is readily caulked to make it waterproof. A caulking bead 53 may be applied between the two portions 50 and 52 as shown.

A number of alternative tightening methods are available including that of FIGS. 12 and 13 in which the insulation jacketing material 22 is wrapped through and around a split mandrel 55 in such manner that the sheet may be rolled up over the mandrel 55 by its clockwise rotation as shown. In this case, a fixed end 56 of the insulation sheet 22 is bent into an oblique angle with a tab 57 suitable for the nose of a gripper block 58, preferably part of a rigid stationary support block 59. A geared hand wheel, hydraulic motor or other rotative power means may be utilized to apply tensile force to the sheet 22 by means of rotation of the mandrel 55.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A method of applying insulation to cylindrical tanks having an axis, comprising the steps of
    placing a series of cylindrical spacer-rollers around the periphery of a said tank in regular intervals and parallel to the axis of the tank,
    encircling said tank and spacer rollers with a sheet of jacketing having free ends,
    tightening said ends together and tensing the sheet, said spacer-rollers then rolling to enable transmission of the tension all around the sheet,
    foaming-in-place a cellular plastic in the cavities bounded by said tank, said sheet, and said spacer-rollers.

2. The method of claim 1 wherein said jacket sheets are substantially shorter than said tank, and a plurality of vertically superimposed layers are formed, each as in claim 1, said spacer-rollers being approximately the height of the jacket sheet at each layer, and the foaming-in-place being completed for each lower layer before the succeeding upper layer is started by the placing of a new series of spacer-rollers.

3. The method of claim 2 wherein said jacket sheets have a horizontal radially outwardly projecting shelf at their upper edges and a foot at their lower edges, for aiding in installing an upper sheet above a lower sheet.

4. The method of claim 1 wherein at one end said jacket is secured to a non-rotating rectangular support block.

5. The method of claim 1 wherein said tightening is accomplished by clamping the two ends of said jacket separately and bringing the clamped ends toward each other along a plane.

6. The method of claim 5 wherein space remaining between the clamped ends is filled with a metal strip and caulked.

7. The method of claim 1 wherein one end of said jacket is secured to a cylindrical member and wherein tightening is achieved by rolling said cylindrical member.

8. A method of applying insulation to cylindrical tanks having an axis, comprising the steps of
disposing a series of spacers around the periphery of a said tank in regular intervals and parallel to the axis of the tank, while enabling said spacers to move relative to said periphery upon the application of force,
encircling said tank and spacers with a sheet of jacketing having free ends,
tightening said ends together and tensing the sheet, said spacers then moving to enable transmission of the tension all around the sheet, and
foaming-in-place a cellular plastic in the cavities bounded by said tank, said sheet, and said spacer rollers.

9. A method of applying insulation to cylindrical tanks having an axis, comprising the steps of
lightly adhering a series of cylindrical spacer-rollers around the periphery of a said tank in regular intervals and parallel to the axis of the tank,
encircling said tank and spacer rollers with a sheet of jacketing having free ends,
tightening said ends together and tensing the sheet, said spacer-rollers then rolling to enable transmission of the tension all around the sheet and bring it to a generally polygonal shape,
foaming-in-place a cellular plastic in the cavities bounded by said tank, said sheet, and said spacer rollers, the pressure produced during said foaming-in-place tending to urge said jacket back into a cylindrical shape concentric with said tank.

10. A method of applying insulation to cylindrical tanks having an axis, comprising the steps of
movably positioning a series of cylindrical spacer-rollers around the periphery of a said tank in regular intervals and parallel to the axis of the tank,
encircling said tank and spacer rollers with a sheet of jacketing having free ends,
tightening said ends together and tensing the sheet, said spacer-rollers then rolling to enable transmission of the tension all around the sheet and bring it toward a generally polygonal shape,
foaming-in-place a cellular plastic in the cavities bounded by said tank, said sheet, and said spacer rollers, the pressure produced during said foaming-in-place forcing said jacket back into a cylindrical shape concentric with said tank.

References Cited

UNITED STATES PATENTS

| | | | |
|---|---|---|---|
| 2,928,565 | 3/1960 | Glasoe | 220—9 |
| 2,913,798 | 12/1959 | Breguet | 25—118 |
| 3,146,549 | 9/1964 | James | 25—118 |

JAMES A. SEIDLECK, *Primary Examiner.*

L. GARRETT, *Assistant Examiner.*